Figure 1:
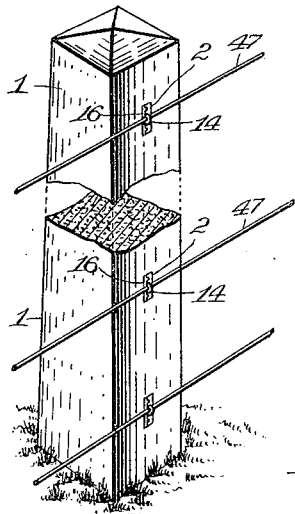

E. T. SILVIUS.
FENCING FASTENER.
APPLICATION FILED DEC. 30, 1909.

1,129,610.

Patented Feb. 23, 1915.

2 SHEETS—SHEET 1.

WITNESSES:
J. H. Gardner.
K. R. Woddell.

INVENTOR:
Ellis T. Silvius.

THE NORRIS PETERS CO., PHOTO-LITHO., WASHINGTON, D. C.

E. T. SILVIUS.
FENCING FASTENER.
APPLICATION FILED DEC. 30, 1909.
1,129,610.
Patented Feb. 23, 1915.
2 SHEETS—SHEET 2.
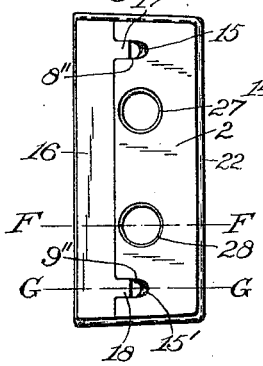
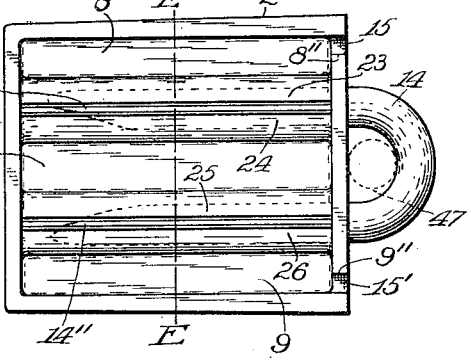
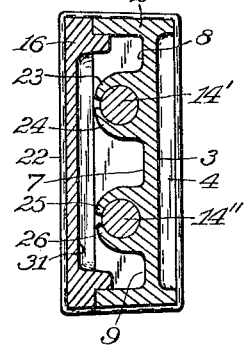
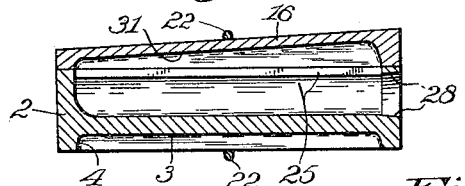
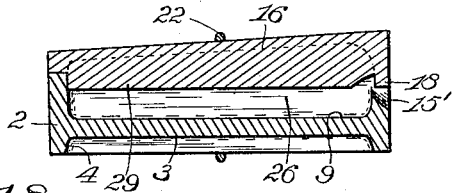
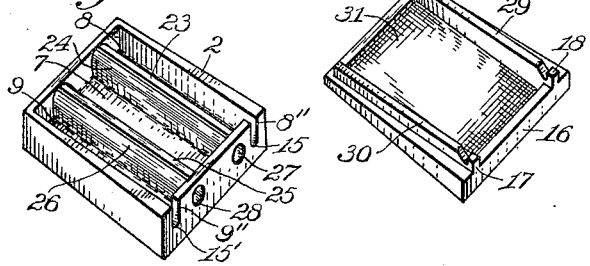
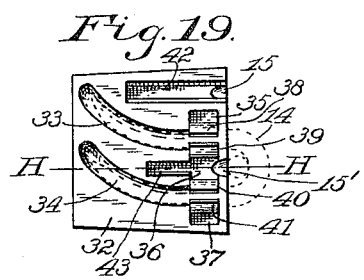
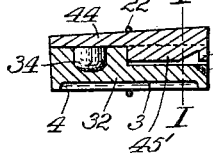
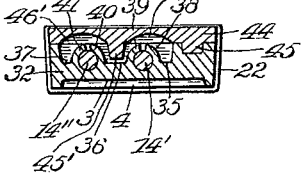
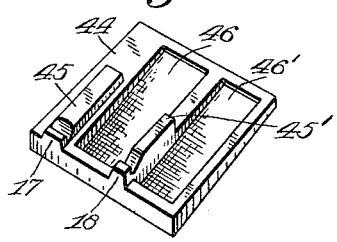
WITNESSES:
J. H. Gardner,
K. R. Woddell.
INVENTOR:
Ellis T. Silvius.

UNITED STATES PATENT OFFICE.

ELLIS T. SILVIUS, OF INDIANAPOLIS, INDIANA.

FENCING-FASTENER.

1,129,610.          Specification of Letters Patent.      Patented Feb. 23, 1915.

Application filed December 30, 1909. Serial No. 535,608.

*To all whom it may concern:*

Be it known that I, ELLIS T. SILVIUS, a citizen of the United States, residing at Indianapolis, in the county of Marion and State of Indiana, have invented certain new and useful Improvements in Fencing-Fasteners; and I do declare the following to be a full, clear, and exact description of the invention, reference being had to the accompanying drawings, and to the letters and figures of reference marked thereon, which form a part of this specification.

This invention relates to the class of composite fence posts that are adapted to have fencing elements secured firmly thereto, the invention having reference more particularly to means whereby fence-fastening devices, such as staples or wire devices, may be connected or secured removably to the body parts of concrete or "cement" posts, for connecting the wires, stringers, or nailing-pieces of fencing to the posts.

The object of the invention primarily is to provide an improved composite post that will contain the minimum amount of metal in devices for connecting fastening staples, wires or nails thereto, in order to cheapen the construction of the posts; another object being to provide relatively simple fastening-holders for posts that will be adapted to be embedded either removably or permanently in the concrete post bodies, and be adapted also to securely hold staples or nails therein so as to be removable therefrom; a further object being to provide fastening-holders for posts that will be adapted to be composed of few parts and be easily assembled and embedded in the plastic material when molding the post bodies.

With the above-mentioned and other objects in view the invention consists in an improved composite post having the body part thereof composed principally of sand and cement, and gravel if desired, and fence-fastener holders of novel construction embedded in the body part, either permanently or removably, each holder being composed of a single piece and having a channel or channels in one side thereof to receive the fastening device or devices, the walls of the channels being capable of having embracing contact with the devices to secure them in the holder, each holder being provided with a plate for covering the channel or channels to exclude the plastic material therefrom, the plate preferably being wedge-shaped and serving to key and retain the holder removably in the body part of the post; and the invention consists further in the novel parts, and combinations and arrangements of parts, as hereinafter particularly described and further defined in the accompanying claims.

Figure 2:
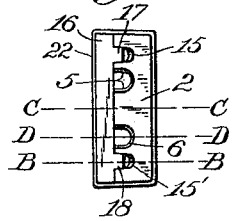
Figure 3:
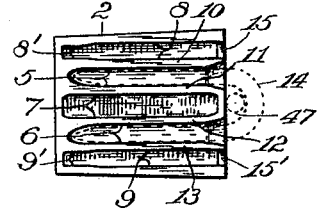
Figure 4:
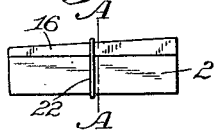
Figure 5:
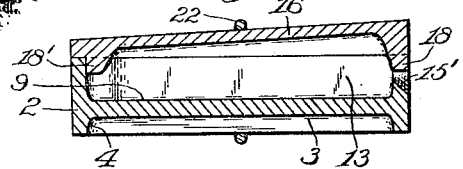
Figure 6:
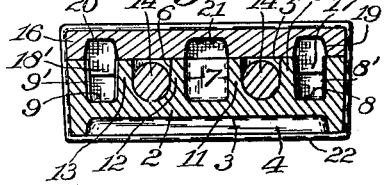
Figure 7:
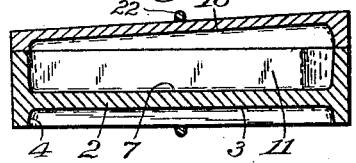
Figure 8:
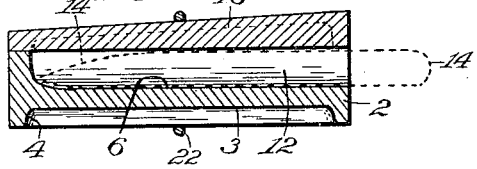
Figure 9:
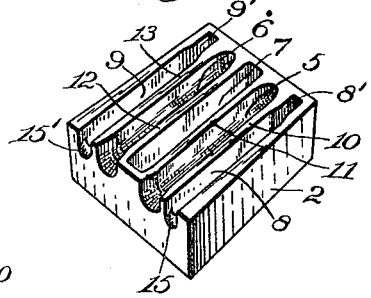
Figure 10:
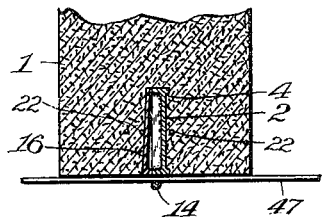
Figure 11:
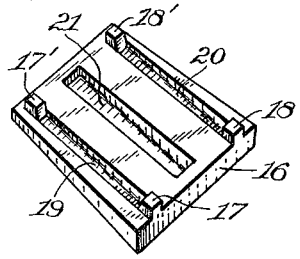

Referring to the drawings, Figure 1 is a perspective view of a fence post, partially broken away, constructed substantially in accordance with the invention and having fence-wires connected thereto; Fig. 2, a front elevation of one of the improved fence-fastener holders provided with a key or plate covering the channels in the holder and bound together ready to be embedded in plastic material; Fig. 3, a plan of one of the holders showing the side that has the channels therein; Fig. 4, a side elevation of the holder and its locking-key bound together; Fig. 5, an enlarged sectional view on the line A A in Fig. 4 in which the legs of the staple are shown; Fig. 6, a sectional view on the line B B in Fig. 2; Fig. 7, a sectional view on the line C C in Fig. 2; Fig. 8, a sectional view on the line D D in Fig. 2; Fig. 9, a perspective view of one of the fastener holders; Fig. 10, a fragmentary horizontal sectional view of the post taken centrally through one of the holders and its locking-key; Fig. 11, a perspective view of the locking-key showing the inner side thereof; Fig. 12, a front elevation of the holder and its cover plate slightly modified; Fig. 13, a plan of the inner side of the modified form of holder, in which a staple is secured; Fig. 14, a sectional view of the holder and its cover plate on the plane of the line E E in Fig. 13; Fig. 15, a sectional view on the line F F in Fig. 12; Fig. 16, a sectional view on the line G G in Fig. 12; Fig. 17, a perspective view of the modified holder; Fig. 18, a perspective view of the modified cover-plate or key showing the inner side thereof; Fig. 19, a plan of another modified form of holder showing the inner side thereof; Fig. 20, a sectional view of the holder shown in the preceding figure and its locking-key on the plane of the line H H in Fig. 19; Fig. 21, a sectional view on the line I I in Fig. 20 with staple legs secured in the holder; and Fig. 22, a perspective view of the modified form of plate or locking-key shown in Figs. 20 and 21.

Similar reference characters throughout the drawings indicate corresponding elements or features of construction.

The fence-fastening holder constructed specifically as shown in Figs. 2 to 10 inclusive is adapted to be formed of malleable iron cast steel, or tough cast-iron, or to be drop-forged from wrought iron or steel, as may be preferred, and is adapted to be embedded in the body part 1 of the post when molded of plastic material in which it is suitably secured, each holder 2 consisting of a single element or piece of metal having preferably a recess 3 in its back, so as to form a shoulder 4 for locking the holder in the concrete body, or the shoulder may be otherwise provided. When the back is recessed, however, excessive weight and cost of material is avoided. The opposite side of the holder has two straight grooves 5 and 6 extending longitudinally parallel one to the other from the normally forward end nearly to the rear or inner end of the holder and forming channels to receive the legs of a staple or wire-nails. A recess 7 is formed between the grooves and other recesses 8 and 9 are formed at opposite sides of the grooves, so that relatively thin walls 10, 11, 12, 13, remain as the walls of the channels, portions of the walls thus being adapted to yield slightly when composed of elastic material, and the channels are each approximately equal in width to the diameter of a staple-leg, so that the staple 14 may be driven or pressed into the channels with considerable force, and have the legs 14′ and 14″ held frictionally by the opposing walls of the channels. The recesses 8 and 9 extend from the forward end of the holder nearly to the rear end thereof and have relatively narrower portions 8′ and 9′, respectively, at their inner ends. The bottoms of the outer ends of the recess or channels 8 and 9 have beveled end portions 15 and 15′ to receive tools for removing the locking-key 16 which preferably is wedge-shaped and is adapted to cover the channels and recesses in the holder, being placed against the side in which they are formed, the inner side of the key or plate having projections 17 and 18 at the forward end thereof to enter the recesses 8 and 9, respectively, and other projections 17′ and 18′ at the rear end thereof to enter the narrow portions 8′ and 9′, the projections being adapted to prevent the plate from shifting with respect to the holder while being handled or embedded in the plastic material, but permitting the plate or key to be moved forward from the post body, so as to be removed therefrom and permit the holder to be moved laterally into the space previously occupied by the key, in order to release the shoulder 4 from the portion of the post body formed by the shoulder in the socket formed in the post body by the holder and its locking-key. Preferably the inner side of the key 16 has recesses 19, 20, 21, formed therein to reduce weight and cost of the metal, the outer side of the key having a plane surface. A band 22 is placed around the holder and its key to bind the two parts together while being embedded in the plastic material, and it will be apparent that if a tool having two ends be inserted in the beveled portions 15 and 15′ at the ends of the recesses 8 and 9, the tool may engage the inner sides of the projections 17 and 18 to force the key outward from the post-body to release the holder. It should be understood that the grooves 5 and 6 are of sufficient depth to admit the staple-legs or nails without contacting with the inner side of the key or plate 16, and it will be apparent that if it is desired to embed the holder permanently in the post body the key or plate 16 need not be wedge-shaped, and it may be relatively thin. The holder and its key or plate are substantially rectangular in cross-section, but it will be understood that they are obviously made with sufficient "draft" to permit them to be drawn from the sand molds in the foundry or from the post body.

In Figs. 12 to 18 inclusive the holder and its key are slightly modified, so as to be particularly well adapted to be composed of malleable iron or to be drop-forged, the holder 2 having the recess 3 in its back and shoulder 4, as before described, and the opposite side has two channel walls 23 and 24 curved each toward the other, so as to extend partially about and embrace the leg 14′ of the staple and also two other opposing walls 25 and 26 that are curved each toward the other, so as to extend partially about the other leg 14″ of the staple, the walls forming two straight channels or sockets into which the staple legs may be forcibly driven, the walls being sufficiently thin to be yielding, if composed of elastic material, to compensate for possible variations in the width of channels or diameter of the staple legs. The forward end of the holder has two apertures 27 and 28 registering with the channels or sockets formed by the curved walls. The inner side of the key 16 is provided with the projections 17 and 18 that enter recesses 8″ and 9″ formed at the forward ends of the recesses 8 and 9 respectively, and other projections 29 and 30 are formed also on the key to engage the inner sides of the outer walls of the recesses 8 and 9 for positioning the key with respect to the holder, the inner side of the key preferably having a recess 31 in order to save metal. In other respects the holder and its key is substantially the same as shown in Figs. 1 to 11 inclusive.

In Figs. 19 to 22 is shown a slightly modified holder 32 that has the recess 3 in its back which forms the shoulder 4, and the opposite side of the holder has two curved grooves 33 and 34 therein to receive and flex the legs of a staple in one direction, so that the holder may have the minimum length and width. At opposite sides of the grooves near the forward end or front of the holder are recesses 35, 36, 37, from which extend walls 38 and 39 that are curved partially over the groove 33, and two other walls 40 and 41 that are curved partially over the groove 34, the curved walls forming channels or sockets into which the staple legs may be driven through the forward end of the holder which, it will be understood, is similar to the forward end of the holder shown in Fig. 12. A straight groove 42 is formed near the recess 35 and another groove 43 is formed between the grooves 33 and 34. A key or plate 44 is adapted to cover the grooves and recesses and has the projections 17 and 18 at its outer end and also other projections 45 and 45' to enter the grooves 42 and 43 for positioning the key relatively to the holder, the inner side of the key preferably having recesses 46 and 46' to save metal. The holder 32 may be suitably drop forged or it may be made as a malleable iron casting if preferred.

In practical use a post comprising the improvements may be set in the ground and remain permanently, and fencing elements as 47 may be supported thereby by means of the staples 14 secured in the holders, and if for any reason it be desired to remove the fencing it will be apparent that the staples may be forcibly withdrawn from the holders, and also the holders may be removed from the post bodies if the cover plates thereof be made wedge-shaped, as shown, and that in case the holders and keys eventually corrode, so that their usefulness becomes impaired, they may be removed readily and new ones inserted in their places while the post bodies remain standing.

In case the holder is modified as shown in Fig. 19 and the staple can not be withdrawn by reason of having become weakened by corrosion, the loop of the staple may be severed to release the fencing-wires, and then the holder may be removed with the staple legs from the post body, after which the inner ends of the staple legs may be turned slightly and then withdrawn from between the walls of the holder.

It is obvious that other forms of fencing fasteners than staples may be secured in the holders if desired, it being common for instance to use nails or wires for securing fencing elements to posts having sockets therein.

Having thus described the invention, what is claimed as new, is—

1. A fencing-fastener holder composed of a single unitary element having a channel adapted to retain a fencing-fastener therein and provided with a cover adapted to extend over the channel.

2. A fencing-fastener holder comprising a single unitary wedge-shaped element having a channel adapted to retain a fencing-fastener therein, and a wedgse-shaped cover adapted to extend over the channel.

3. A fencing-fastener holder having a groove in one side thereof extending to one end of the holder and also a separate recess extending also to the end of the holder at one side of the groove, and a plate to cover the groove and having a projection on one side thereof to enter the recess.

4. A fencing-fastener holder comprising an element having two grooves in one side thereof that have each a greater depth than width to receive staple-legs, another side of the element having a shoulder thereon, and a plate matched to the element to cover the grooves.

5. A fencing-fastener holder comprising an element having two straight grooves in one side thereof and also a recess in the side and adjacent to one of the grooves, and a plate matched to the element to cover the grooves and having a projection thereon to enter the recess.

6. A fencing-fastener holder comprising an element having two grooves and also a recess in one side extending to one end thereof, the walls of the grooves being adapted for normally holding the legs of a staple removable in the grooves, and a plate matched to the element to cover the grooves and having a projection to enter the recess.

7. A fencing-fastener holder comprising an element having in one side thereof two straight grooves that extend from one end nearly to the opposite end of the element, the side having also a recess between the grooves, a portion of one side wall of each groove extending partially over the groove, and a wedge-shaped plate matched to the element to cover the grooves and recess.

8. A fencing-fastener holder comprising an element having in one side thereof two grooves and a recess between the grooves, and also two recesses at the opposite sides of the grooves, the grooves and the recesses being straight and parallel one to another, and the grooves and the recesses extending to one end of the element, and a plate to cover the grooves and having projections to enter the recesses.

9. A composite post comprising a concrete body part, a plurality of fencing-fastener holders comprising each an element having a shoulder on one side and also two grooves adapted to removably retain a staple in the opposite side thereof, said opposite side having also a recess therein, a wedge-shaped key matched to the element to cover the grooved side thereof and having a projection thereon extending into the recess, and a band extending about the element and key, the element, key and band being embedded in the concrete body part.

10. In a fencing-fastener, a holder comprising a wedge-shaped element having a groove in one side thereof extending to the broader end of the element, another side of the element having a shoulder thereon facing toward the plane of broader end, and a wedge-shaped plate to cover the groove.

11. In a fencing-fastener, a holder comprising an element having a groove in one side thereof extending to one end of the element, the groove being greater in depth than width, another side of the element having a shoulder thereon facing toward the plane of the said end, and a plate for covering the groove.

12. In a fencing-fastener, a holder comprising an element having a groove in one side thereof extending to one end of the element, said side being provided also with a guide extending to said end, and a relatively thin plate for covering the groove having a guide on one side extending to one end thereof to coöperate with the guide on the holder element.

13. In a fencing-fastener, a holder comprising an element having a groove and also two recesses in one side thereof at opposite sides of the groove, portions of the walls of the element between the groove and the recesses being relatively thinner than the width of the groove, and a plate for covering the groove and the recesses.

14. In a fencing-fastener, a holder comprising an element having a groove in one side thereof for removably retaining a fastener-leg, the element having also a recess in another side thereof to form a shoulder, the groove extending to one end of the element, a plate on the grooved side of the element covering the groove, and a band extending about the element and the plate.

15. In a fence post, the combination of a concrete body part, a fencing-fastener holder comprising an element having a groove in one side thereof adapted to removably retain a fastener leg, another side of the element having a shoulder thereon, a cover plate that is relatively thinner than the holder element seated on said grooved side and extending across the groove, and a band extending about the element and the plate, the element, plate and band being embedded in the concrete body part.

In testimony whereof, I affix my signature in presence of two witnesses.

ELLIS T. SILVIUS.

Witnesses:
HARRY D. PIERSON,
J. H. GARDNER.

Copies of this patent may be obtained for five cents each, by addressing the "Commissioner of Patents, Washington, D. C."